(12) United States Patent
Jackson

(10) Patent No.: US 6,937,190 B1
(45) Date of Patent: Aug. 30, 2005

(54) ELECTROMAGNETIC IMPULSE SURVEY APPARATUS AND METHOD

(76) Inventor: John R. Jackson, 7987 S. Saulsbury St., Littleton, CO (US) 80128

( * ) Notice: Subject to any disclaimer, the term of this patent is extended or adjusted under 35 U.S.C. 154(b) by 0 days.

(21) Appl. No.: 10/413,805

(22) Filed: Apr. 15, 2003

Related U.S. Application Data

(60) Provisional application No. 60/319,188, filed on Apr. 16, 2002.

(51) Int. Cl.[7] .............................. G01S 3/02; G01V 3/08
(52) U.S. Cl. ..................... 342/459; 324/344; 324/348
(58) Field of Search ..................... 342/459; 324/348, 324/344, 349, 350, 335

(56) References Cited

U.S. PATENT DOCUMENTS

| | | |
|---|---|---|
| 2,246,542 A | 6/1941 | Smith |
| 2,608,602 A | 8/1952 | Muffly |
| 2,623,923 A | 12/1952 | Zimmerman |
| 3,087,111 A | 4/1963 | Lehan et al. |
| 3,136,943 A * | 6/1964 | Slichter ....................... 324/344 |
| 3,197,704 A | 7/1965 | Simon et al. |
| 3,361,957 A | 1/1968 | Hings |
| 3,510,766 A | 5/1970 | Russell et al. |
| 3,662,260 A | 5/1972 | Thomas et al. |
| 3,679,978 A | 7/1972 | Hopkins, Jr. |
| 3,700,933 A | 10/1972 | Harkenrider et al. |
| 3,942,101 A | 3/1976 | Sayer et al. |
| 3,986,207 A | 10/1976 | Gerbel et al. |
| 4,198,596 A | 4/1980 | Waeselynck et al. |
| 4,409,551 A | 10/1983 | Norton |
| 4,434,508 A | 2/1984 | Sommer |
| 4,507,611 A | 3/1985 | Helms |
| 4,584,530 A | 4/1986 | Nicholson |
| 4,658,215 A | 4/1987 | Vinegar et al. |
| 4,686,475 A | 8/1987 | Kober et al. |
| 4,724,390 A * | 2/1988 | Rauscher et al. ........... 324/344 |
| 4,825,165 A | 4/1989 | Helms et al. |
| 4,841,250 A | 6/1989 | Jackson |
| 4,945,310 A | 7/1990 | Jackson |
| 5,148,110 A | 9/1992 | Helms |
| 5,629,626 A * | 5/1997 | Russell et al. .............. 324/345 |
| 5,777,478 A | 7/1998 | Jackson |
| 5,811,974 A * | 9/1998 | Hata ........................... 324/344 |
| 6,087,833 A * | 7/2000 | Jackson ...................... 324/348 |
| 6,184,942 B1 * | 2/2001 | Patel et al. ................. 348/726 |
| 6,414,492 B1 * | 7/2002 | Meyer et al. ............... 324/344 |
| 6,553,216 B1 * | 4/2003 | Pugel et al. ................. 455/340 |
| 6,724,441 B2 * | 4/2004 | Choi ........................... 348/731 |
| 6,795,696 B2 * | 9/2004 | Krug ........................... 455/266 |

OTHER PUBLICATIONS

Orange, Arnold S., "Magnetotelluricx Exploration for Hydrocarbons," Proc. of the IEEE, vol. 77, No. 2, Feb. 1989, pp. 287–317.*

(Continued)

Primary Examiner—Gregory C. Issing
(74) Attorney, Agent, or Firm—Andy Arismendi, Jr.

(57) ABSTRACT

A passive geophysical prospecting method and apparatus are provided. The apparatus has an antenna for detecting electromagnetic radiation naturally emanating from the Earth's surface and generating an electrical signal from the detected electromagnetic radiation while traversing the Earth's surface by a vehicle traveling over land or water or in an airplane. The electrical signal is filtered of frequencies below 65 Hz, preferably above 100 Hz and more preferably below 800 Hz, and above 12,000 Hz, preferably above 8,000 Hz, to generate a filtered signal. The filtered signal is converted to a prospecting voltage signal. The prospecting voltage signal is then compared to a set voltage and a difference signal is generated, recorded and analyzed.

14 Claims, 7 Drawing Sheets

OTHER PUBLICATIONS

Proceedings of the IEEE, vol. 67, No. 7, Jul. 1979, "The Fundamental Model of Magnetotelluric Sounding", Dmitriev and Berdichevsky.

"Geophysical Exploration by Telluric Currents, with Special Reference to a Survey of the Haynesville Salt Dome, Wood County, Texas", Eric Boissonnas and Eugene G. Leonardon, Geophysics, Jul. 1948, pp. 387–403.

The Art of Electronics, Second Edition, Horowitz and Hill, Cambridge University Press 1980, 1989, pp. 641–655, 889, and 895–901.

Electronics Engineers' Handbook, First Edition, Fink and McKenzie, McGraw–Hill Book Company, 1975 pp. 19–23, through 19–25; pp. 22–62 through 22–64.

Radio Shack Dictionary, .COPYRGT.1972, by Howard W. Sams & Co., Inc. Indianapolis, Indiana, pp. 364,374,448.

Geophysics, vol. 50, No. 4 (Apr. 1985), pp. 656–664, "Geophysical exploration with audiofrequency natural magnetic fields", Labson, Beker, Morrison, Conti.

* cited by examiner

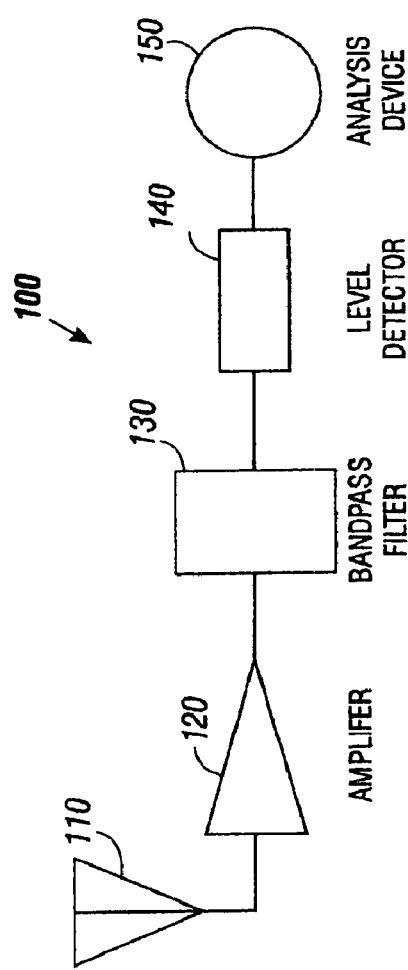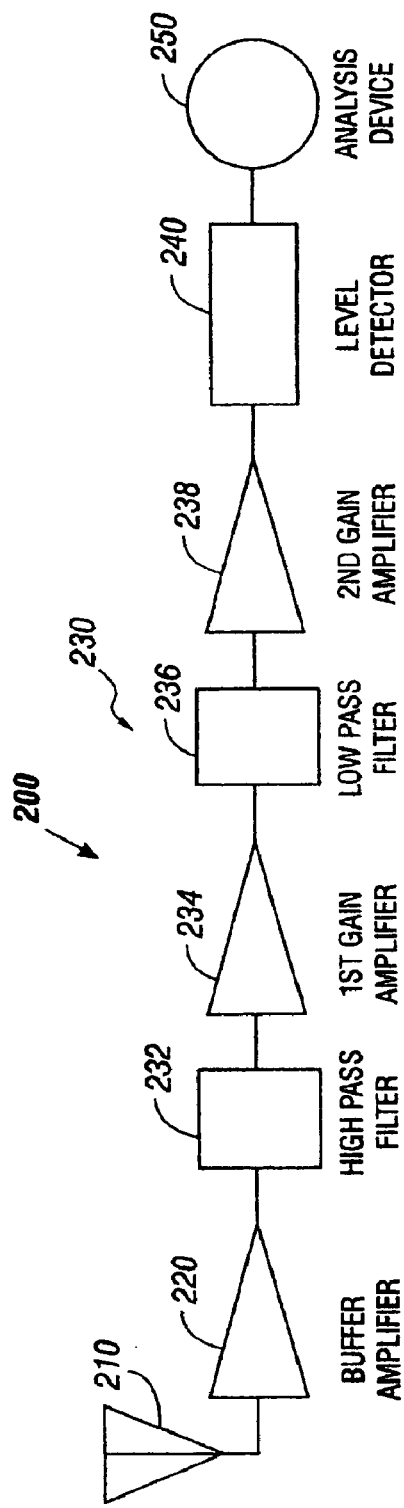

ELECTROMAGNETIC IMPULSE SURVEY APPARATUS AND METHOD

RELATED APPLICATION

This application claims priority to and benefit of the prior filed and co-pending Provisional Application No. 60/319,188, filed Apr. 16, 2002, entitled "Electromagnetic Impulse Survey Apparatus and Method," the entirety of which is hereby incorporated by reference herein.

FIELD OF THE INVENTION

The present invention relates to an apparatus and method for performing passive geophysical prospecting. More particularly, the present invention relates to an improved apparatus and method for locating and identifying selected subsurface Earth material deposits or geologic formations bearing hydrocarbons, e.g., oil and/or gas, or commercially important ore deposits, e.g., precious metals, as a function of ionospheric impulse discontinuities in the near surface atmosphere.

BACKGROUND OF THE INVENTION

It is well known that petroleum deposits, ore bodies, and other valuable Earth materials are found at various locations and depths in the Earth, and that these Earth materials are often difficult if not impossible to find with the naked eye. Accordingly, it is also well known that many different exploration techniques and systems have been developed to provide a reliable indication of the presence of these commercially important deposits.

It is conventional, of course, to drill test holes at locations of particular interest, and to recover samples of Earth materials at various depths, to determine the actual character of the Earth materials. If cost were not a factor, drill holes such as for oil and gas would be cored throughout their entire length. This is not feasible, however, for reasons of economy. As such, cheaper procedures have been developed and utilized.

It is also conventional to measure topographical irregularities in order to obtain an indication of the existence of subsurface structures of particular interest. Similarly, it is conventional to measure differences in seismic reverberations, and to measure variations in gravitational pull at selected locations. Although such measurements are often used with success to locate faults, traps and other subsurface Earth structures wherein oil and other valuable minerals could be found, most strata-graphic traps and the like do not contain such minerals, and therefore such measurements are most useful for eliminating unlikely areas of interest rather than to detect actual deposits of minerals.

More recently, procedures for subsurface prospecting have been developed which measure electromagnetic radiation emitted by the mineral-bearing formations. It is known, of course, that this planet itself constitutes and functions as a generator of electromagnetic radiation which, in turn, creates current flows within the Earth. Accordingly, measurement techniques such as those described in U.S. Pat. No. 3,679,978 have been developed to detect and analyze these magneto-telluric currents within the Earth bed adjacent the surface, as a direct indication of selected minerals of interest. Although effective in locating and measuring the extent of ore bodies, such techniques do not indicate the type of minerals present.

It is apparent that if the planet is a generator of electromagnetic radiation within itself, these current flows within the Earth will include both AC and DC currents which will be functionally related to both the individual mineral-bearing formations and their contents. Furthermore, it will be apparent that current flows within but adjacent the surface of the Earth will inherently create functionally related electrical fields adjacent but above the surface of the Earth. These electrical fields are composed of carrier waves having frequencies characteristic of the type of mineral in that formation.

Several techniques have been developed to measure these electrical fields which exist near but above the surface of the Earth. U.S. Pat. No. 4,507,611 to Helms describes a method of traversing the surface of the Earth and recording "solar wind" activity of sufficient strength to detect anomalies related to surface and subsurface mineral deposits. This apparatus uses the root mean square (RMS) method to detect increases or decreases in the Earth's electrical fields. U.S. Pat. No. 3,942,101 to Sayer describes a prospecting apparatus that utilizes a distortion of the atmospheric electrostatic potential gradient, which is suggested to be a result of the Nernst effect. Sayer teaches that the distortion provides a means for locating subterranean sources of geothermal energy. Alterations in the Earth's magnetic fields known as "magnetic noise" is described by Slichter in U.S. Pat. No. 3,136,943, which discloses that such noise is primarily the product of lightening discharges. However, because many of these methods and apparatus are based on the AC components of the electrical fields, the techniques are more effective and reliable depending upon the size or area extent of the mineral deposit of interest. More particularly, the techniques based on the AC components are less sensitive and effective in detecting the presence of smaller mineral deposits. To overcome the shortcomings of the AC measurements, U.S. Pat. No. 4,841,250 to Jackson provides a technique utilizing the DC components of the electrical fields.

It is also known to utilize the electromagnetic radiation emitted by the mineral-bearing formations to create radioactivity "logs." In oil-field terminology, a "log" is a report that furnishes information regarding the geological formations. A radioactivity log includes the gamma-ray log, gamma—gamma log, neutron-gamma log and neutron—neutron log. The gamma-ray log records the natural radioactivity in the form of gamma-rays in the bore hole emanating from the formation. The most abundant radioactive isotope is $K^{40}$, which occurs in potassium-bearing minerals and is especially abundant in clay minerals. Therefore, the gamma-ray log distinguishes shale beds from non-shale beds by recording a high gamma radiation. In the gamma—gamma log, the radiation is induced by bombarding the bore-hole walls with gamma rays. The amount of back-scatter is recorded. Because the more dense atoms resist the bombardment, the back-scatter is greater. Accordingly, the amount of back-scatter is directly related to the bulk density of the formation and to the porosity.

In the two neutron logs, the formation is bombarded with neutrons. The neutron-gamma log measures the induced gamma radiation from the heavier atoms. In this reaction, hydrogen ions absorb the neutron particles, and reduced gamma radiation indicates the relative abundance of hydrogen, which may exist largely in the fluids of pores. Therefore, the induced gamma radiation is inversely proportional to the porosity of the formation. The neutron—neutron log measures neutron capture within the formation, which again is proportional to the hydrogen density and therefore to the porosity or bulk density of the formation.

A limitation of the radioactivity log is that they cannot distinguish between water and hydrocarbons, e.g. oil. Both would indicate a relative abundance of hydrogen and, therefore, the presence of porous formations. These logs could not distinguish between these two. The use of radioactive detection at the Earth's surface or near surface has been well known for many years and known as radiometrics, which is a method to log variations in the Earth's natural radioactive emissions as one traverses the surface on land or by plane in order to measure decreases and increases in these emissions in order to locate oil, gas and mineral deposits.

These disadvantages of the prior art are overcome with the present invention, and improved methods and apparatus for passive geophysical prospecting are provided for obtaining a more sensitive and precise measurement of the presence and character of relatively small deposits of valuable materials, e.g., hydrocarbons, ore deposits, and precious minerals.

THEORY OF THE INVENTION

As discussed above, a primary magnetic field of electromagnetic energy is generated by the Earth itself and exists in the near surface atmosphere. Within the primary magnetic field exist random occurring impulses of energy. These impulses, which occur within the audio frequency range, exist in the random vertical components of the Earth's primary magnetic field.

Secondary magnetic fields result from the current flows associated with the radiation emanating from the hydrocarbon accumulation within the Earth as the result of the chemical release of electrons during a redox reaction. [cite Mr. S. J. Peirson of Te University of Texas]. As the random occurring impulses in the primary magnetic field interact with the secondary magnetic fields, energy is transferred to the secondary fields creating an impulse. The number of impulses is related to the strength of the secondary magnetic fields.

At present, the source of these random occurring impulses is speculative. However, it is widely believed that the impulses are related to lightning activity around the Earth. One study conducted by S. H. Ward showed the relationship between lightning activity and resulting changes in the measured electrical fields. [citation]. AF-MAG-AIRBORNE AND GROUND", Geophysics, No. 4, October 1959, pp. 761–789 describes measuring lightening activity in the audio range of frequencies near Kitwe in northern Rhodesia during the months of July, August, September and October of 1957. Another study concluded that lightning discharges in the Earth-ionosphere cavity would propagate with a horizontal traverse magnetic field that is perpendicular to the direction of propagation. [citation]. However, regardless of source, the existence of random occurring impulses is recognized.

SUMMARY OF THE INVENTION

A passive geophysical prospecting method is provided. The method comprises: traversing above the surface of the Earth with an antenna; detecting electromagnetic radiation naturally emanating from the Earth's surface with the antenna; generating an electrical signal from the detected electromagnetic radiation while performing the traversing step; filtering from the electrical signal frequencies below 65 Hz, preferably below 100 Hz and more preferably below 800 Hz, and above 12,000 Hz, preferably above 8,000 Hz, to generate a filtered signal; converting the filtered signal to a prospecting voltage signal; and comparing the prospecting voltage signal to a set voltage (or reference voltage) and generate an output signal which provides information regarding the presence or absence of the deposit of interest. The output signal is preferably in the form of a voltage or as counts in analog or digital format. The output signal can be recorded and can also be converted from a voltage to counts.

A passive geophysical prospecting apparatus is also provided. The apparatus comprises:
an antenna for detecting electromagnetic radiation naturally emanating from the Earth's surface and generating an electrical signal from the detected electromagnetic radiation while traversing above the Earth's surface; a filter for filtering from the electrical signal frequencies below 65 Hz, preferably below 100 Hz and more preferably below 800 Hz, and above 12,000 Hz, preferably 8,000 Hz to generate a filtered signal; a converter for converting the filtered signal to a prospecting voltage signal; a level detector for comparing the prospecting voltage signal and a set voltage and generating a difference signal; and means for recording the difference signal.

BRIEF DESCRIPTION OF THE DRAWINGS

FIG. 1 shows a block diagram of an embodiment of the electromagnetic impulse survey apparatus according to the present invention.

FIG. 2 shows a block diagram of another embodiment of the electromagnetic impulse survey apparatus according to the present invention.

DETAILED DESCRIPTION

Figure 3:
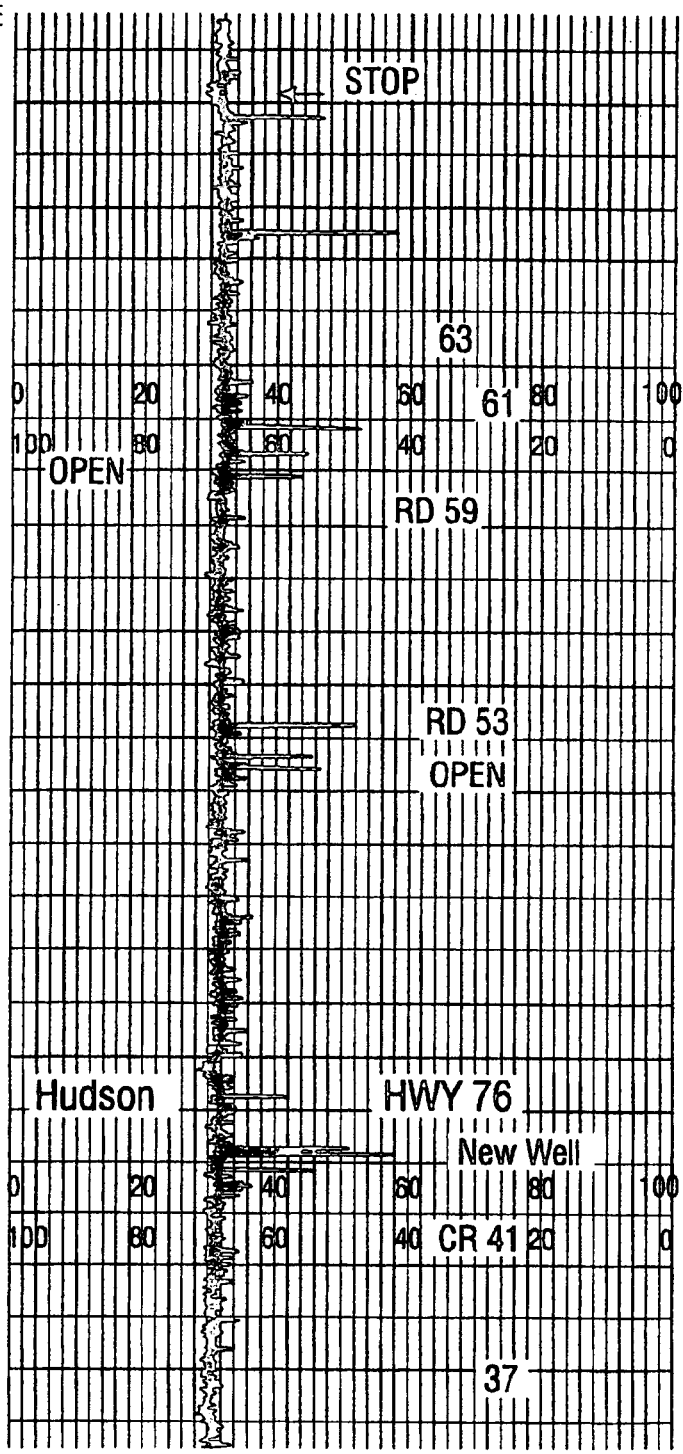
FIG. 3 shows a log obtained using an electromagnetic impulse apparatus according to the present invention.

The following detailed description illustrates the invention by way of example and not by way of limitation. FIG. 1 shows a block diagram of a preferred embodiment of the electromagnetic impulse survey apparatus 100 according to the present invention. The apparatus 100 comprises an antenna 110 for detecting electromagnetic impulses originating from subsurface formations and for producing a signal which is amplified in an amplifier 120. The amplified signal is then passed through a band pass filter 130 to selectively eliminate frequencies below a certain frequency level and also frequencies above a specific frequency. This may be accomplished by a single device or a high pass filter in combination with a low pass filter. The signal exiting the band pass filter 130 is then sent to a level dectector 140. The level detector 140 compares the signal to a set output voltage reference. When the signal exceeds a set voltage reference of the level detector 140, a pulse or count is output to an analysis device 150. Typically, counts per second are output to either a computer for digital counting and alarm detection or to a voltage detection circuit for recording the counts per second on a chart recorder.

Referring to FIG. 2, a block diagram of a preferred embodiment of the present invention is shown. The electromagnetic impulse survey apparatus 200 comprises an antenna 210 for detecting the electromagnetic noise of the formations traversed. The sensed signal is then passed from the antenna 210 to a buffer amplifier 220. The signal is then sent to the band pass filters 230 which may be set to pass different bands of frequencies and eliminating those frequencies outside their respective ranges. For example, the band pass filters 230 may be set to pass a frequency range from about 65 Hz to about 12,000 Hz, for example from about 800 Hz to about 8,000 Hz, to yield overall formation noise. Frequencies below and above the specified ranges would be eliminated to provide the sought after information.

In a preferred embodiment of the present invention, the band pass filtering stage is preferably within the audio frequency range. The band pass filtering stage more preferably having at least one channel wherein the channel filters out frequencies below 65 Hz, preferably below 100 Hz and more preferably below 800 Hz, and above 12,000 Hz, preferably above 8,000 Hz, to provide hydrocarbon information.

As shown in FIG. 2, the band pass filters 230 of a preferred embodiment has a high pass filter 232, a first gain amplifier 234, a low pass filter 236, and a second gain amplifier 238. The output of the high pass filter 232 is amplified in the first gain amplifier 234 and then sent through the low pass filter 236. The resulting signal is again amplified in the second gain amplifier 238 and sent to a level detector 240 which compares the resulting noise signal to a voltage reference. In one embodiment, the reference voltage was 2.5V. When the signal exceeds the reference voltage level of the level detector 240, a pulse or count is output to an analysis device 250.

The analysis device 250, typically a computer for digital counting and alarm detection and processing or a voltage detection circuit for recording counts per second on a chart recorder, compares the counts per second registered by the level detector 240 with a base count. The base count can be established by traversing the antenna 210 across the surface in the near Earth surface atmosphere over an established homogeneous area and determining the number of impulses encountered per second within the desired frequency range. The counts per second are directly proportional to the strength of the secondary fields. As the antenna 210 approaches an area where an increased secondary field exists, the count rate will increase. Thus, for example, because the size of a hydrocarbon accumulation determines the strength of the magnetic field, as the antenna 210 approaches an area of large hydrocarbon accumulation, the count rate will increase.

In FIG. 3, there is shown a log obtained using an electromagnetic impulse apparatus like that of apparatus 200. The field test demonstrates the value and effectiveness of the apparatus and method of the present invention. Specifically, the log based on impulse counts per second is able to discern the presence of oil producing zones.

The antennas 110 and 210 are preferably a wire having a length of at least 1 foot. 16 gage wire in lengths of 2 ft. to 24 ft. have been used, for example, under the fuselage of an airplane in an airborne embodiment of the present invention. Preferably, between the antenna and the respective amplifier 120 or 220 is a load resistor attached to ground (for example, a 500 ohm pot) for impedance purposes.

The level detector 140 and 240 with associated pulse density circuitry is like that used in U.S. Pat. No. 5,777,476 to Jackson, incorporated herein by reference.

In a preferred embodiment of the present invention, a method of locating subterranean accumulations of hydrocarbons or other valuable minerals is described with reference to FIG. 2. The antenna 210 is traversed over a homogeneous area. The antenna 210 can traverse the area by attachment to a mobile surface vehicle or traverse via an airborne craft. The signals received by the antenna 210 are amplified by the buffer amplifier 220 such that the signal gain is between 100 and 500, for example. The signal is then passed through high pass filter 232 with a frequency cut off at 65 Hz, preferably 100 Hz and more preferably 800 Hz, for example, with a 120 db drop off. After passing through the first gain amplifier 234, the signal passes through the low pass filter 236 with a frequency cut off at 12,000 Hz, preferably 8000 Hz, for example, with a 120 db drop off. The resulting signal is a filtered response of, for example, from 800 Hz to 8.000 Hz. The filtered signal is then buffered and gained using the second gain amplifier 238.

Once the filtered signal is obtained, it is input into the level detector 240. The level detector 240 has a selected voltage reference. The signal is increased with the second gain amplifier 238 until the threshold voltage reference is exceeded, which outputs a pulse count. The signal is again increased until the pulse count per second falls between 60 and 150 counts, for example. The number of counts per second over the homogenous area becomes the base count.

After determining the base count, the area is traversed and the antenna 210 continues to receive signals. As the antenna 210 approaches an area where an increased secondary field exists, the count rate will increase, that is, exceed the base count. The increase is directly proportional to the strength of the secondary fields, which are directly proportional to the hydrocarbon accumulation. Thus, once the base count is determined, increases representing hydrocarbon accumulations can be easily and readily identified. It should be noted that, because the secondary magnetic fields exist over water as well as land, surveys for hydrocarbons utilizing the present apparatus and method can readily be conducted over the oceans that cover the Earth. Unlike radioactivity logs which cannot distinguish between water and hydrocarbons, the present invention does readily distinguish between these two and the identification of hydrocarbons is not affected or inhibited by the presence of water.

Figure 4:
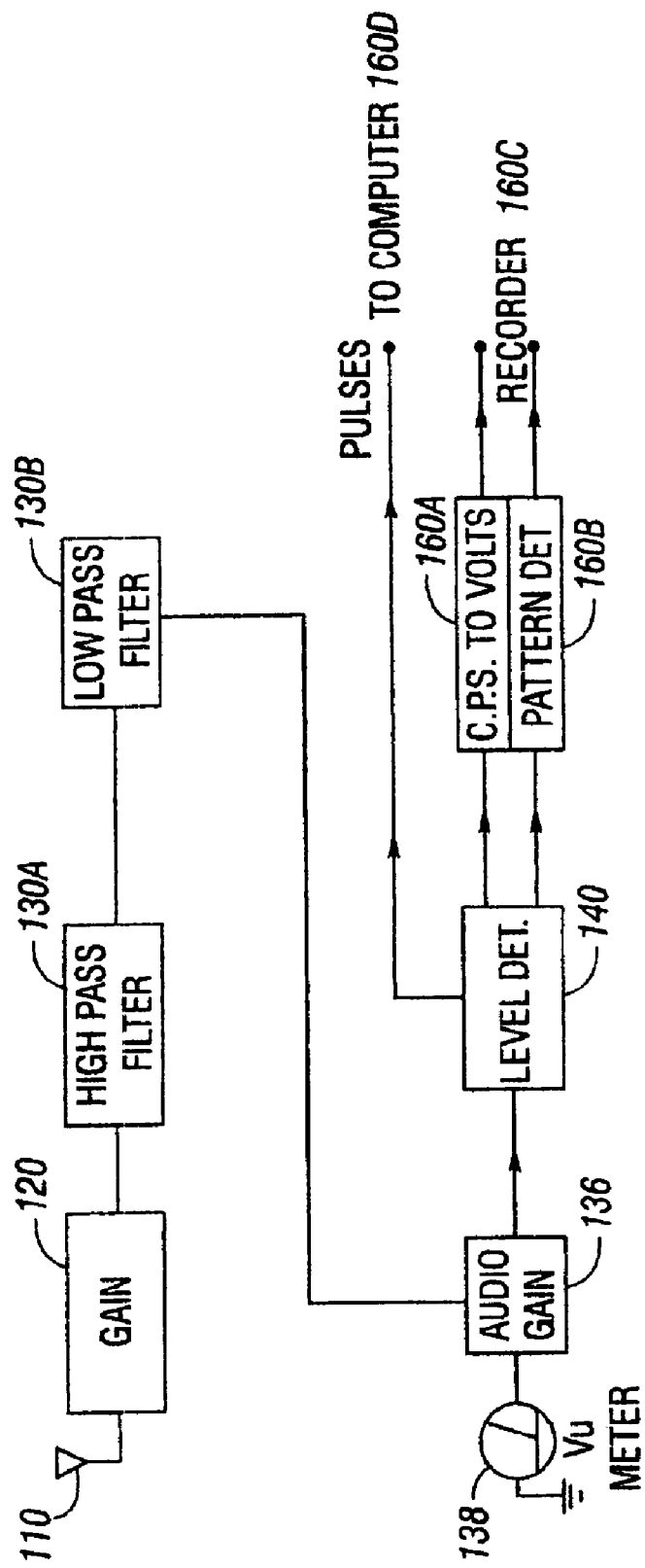
FIG. 4 shows a block diagram of another embodiment of the electromagnetic impulse survey apparatus according to the present invention.

Now referring to FIG. 4, there is shown a functional representation of another embodiment of the present invention. An apparatus 300 is depicted having an antenna 110, a first amplifier 120, a high pass filter 130a, a low pass filter 130b, a second amplifier 136, a meter 138, a voltage level detector 140, a rate meter 160a and a pattern detector 160b. Outputs are provided for a chart recorder 160c (not shown) and to a computer 160d (not shown). The analysis device 160 of FIG. 2 are devices 160a, 160b, 160c and 160d, each of these either used alone or in any combination thereof.

In a specific embodiment, amplifier 120 using a LF442CN dual operational amplifier available from National Semiconductor then amplified the sensed signal from antenna 110. The high pass filter 130a was an active high pass filter using a Burr Brown UAF42 Universal Active Filter configured as a Butterworth filter. The low pass filter 130b used a Burr Brown UAF42 Universal Active Filter configured as a Butterworth filter. The combination of the high pass filter 130a and low pass filter 130b resulted in a pass band of frequencies from about 800 Hz to about 8,000 Hz to yield overall formation noise. The band passed signal was then amplified using a National Semiconductor LM380 audio amplifier 136. The output of the audio amplifier 136 was then sent to the voltage level detector 140 comprising a National Semiconductor LM311 voltage comparator. This detector 140 compared the signal input thereto against a selectable reference DC voltage to generate a difference signal that is proportional to the secondary fields of interest.

The reference DC voltage level can be adjusted using a potentiometer to a desired level to increase or reduce the sensitivity of the detector 140. For example, the reference DC voltage level can be set to a value corresponding to a known area devoid of hydrocarbons so that slight variations above this level will be recognized in the signal range of interest. The comparator, i.e., detector, 140 was configured to output pulses of from 0 to 5 volts representing the important information about subterranean geologic formations and their contents, i.e., hydrocarbons or precious metals. The output of the comparator 140 was sent to a rate meter 160a to be converted from pulses per second to a corresponding voltage. The voltage output of the rate meter 160a was used to establish a base line reference for recording purposes. The output of the comparator 140 was also sent to a pattern detector 160b which counted the number of pulses in a given period of time and outputs a response to a recorder 160c (not shown in FIG. 4) when a preselected number of pulses for a given time period was encountered or exceeded. The preselected number of pulses in a given time period is preferably adjustable. This variable may be adjusted based on the activity encountered in the signal of interest. This difference in activity may be due to the difference in material being prospected, e.g., oil versus gold, and/or the quantity of such material encountered in the subterranean formation. An output from the comparator 140 was also available to a computer 160d (not shown on FIG. 4) where the pulses are digitized and processed using methods and techniques known by those skilled in the art to determine the pulse density over a selected period or unit of time. The processed information may then be printed using a printer (not shown) or shown on a computer screen (not shown).

Figure 5A:
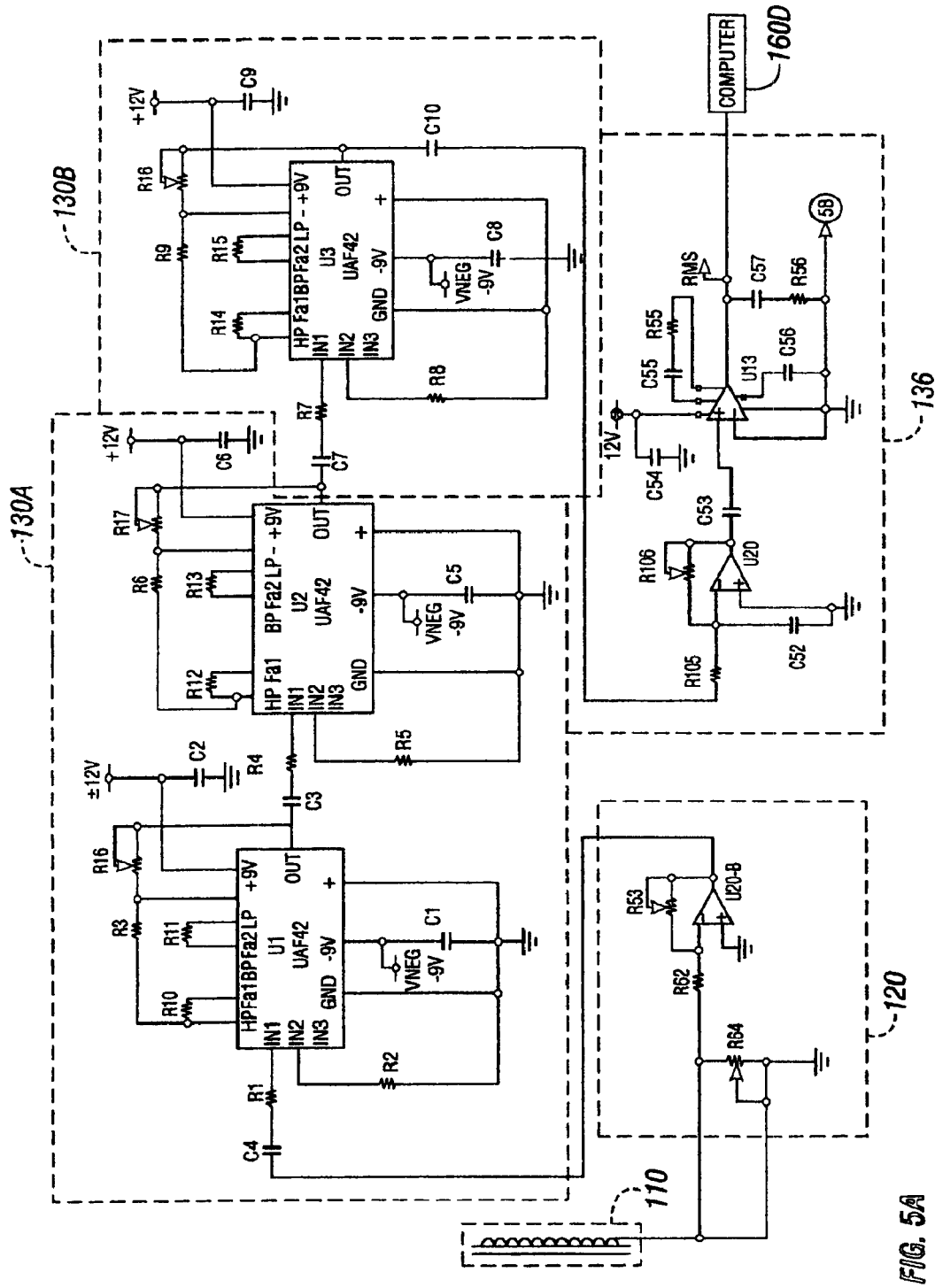
FIGS. 5A and 5B is a detailed schematic of the embodiment shown in FIG. 4.
Figure 5B:
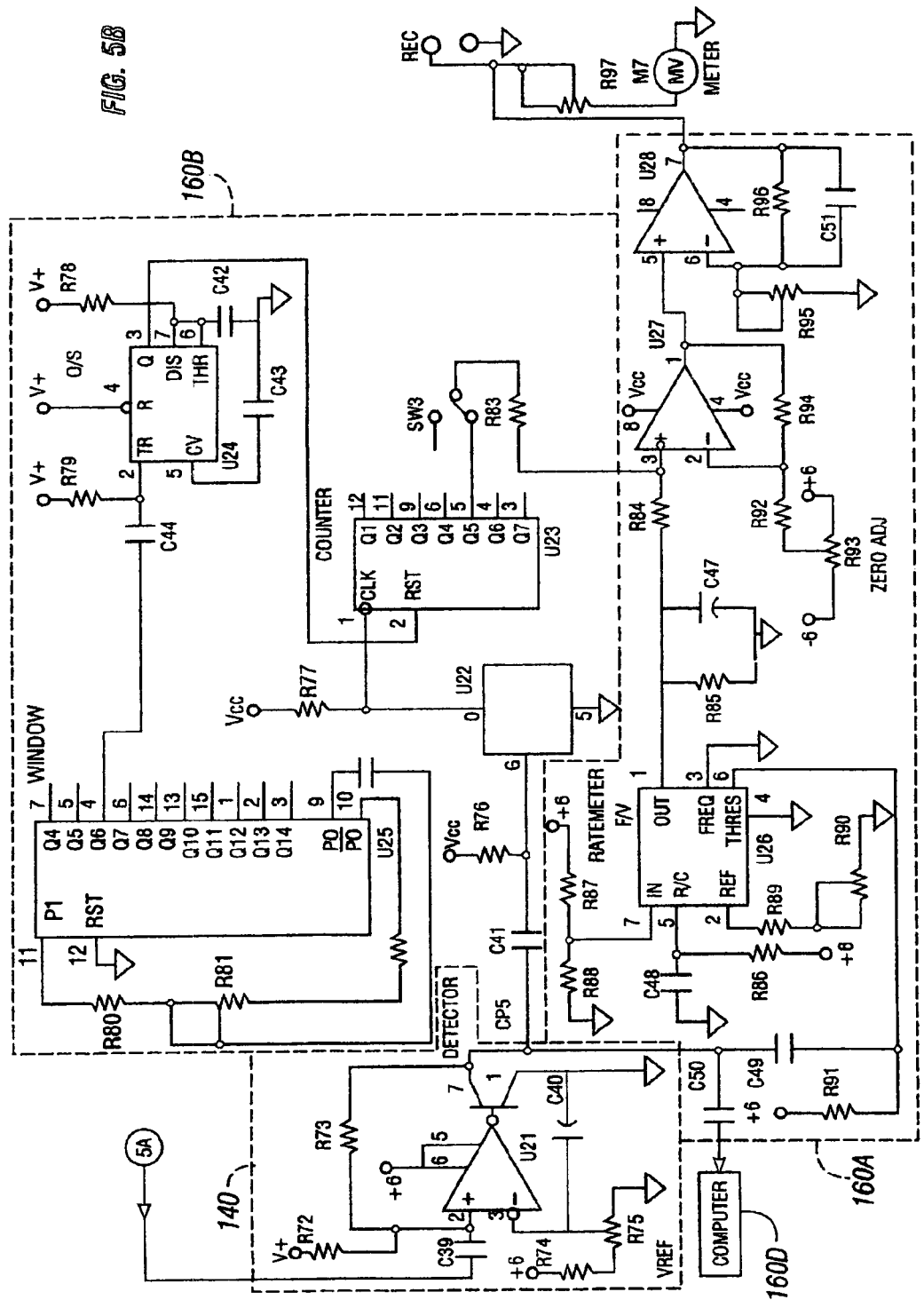

FIGS. 5A and 5B with minor differences (detailed in parentheticals where appropriate) are a detailed schematic of the embodiment shown in FIG. 4. FIG. 5A depicts the antenna 110 and the circuitry for amplifier 120, high pass filter 130a (two UAF42's instead of one), low pass filter 130b and amplifier 136 (which includes a dual op amp LF442CN prior to the LM380). FIG. 5B depicts the circuitry for the voltage level detector 140, rate meter 160a, pattern detector 160b and computer 160d.

The following is a list of the components in FIGS. 5A and 5B. In regards to adjustable resistors or potentiometers, "(adj.)" is indicated next to the maximum resistance. "UAF42" refers to a universal active filter available from Burr Brown. "LF442CN", "LM1496", "LM311", "LM380", "LM555" and "LM331" refer to products available from National Semiconductor. "2n 7000" is a transistor wherein "G" stands for gate, "D" stands for drain and "S" stands for source. "4024" and "4060" are generic chips known to those skilled in the art. "OP 290" is an operational amplifier.

Capacitors:
C1—1 muF
C2—1 muF
C3—0.1 muF
C4—0.1 muF
C5—1 muF
C6—1 muF
C7—0.1 muF
C8—1 muF
C9—1 muF
C10—0.1 muF
C39—1 muF
C40—33 muF
C41—1 muF
C42—0.01 F
C43—0.01 F
C44—0.1 F
C45—0.01 F
C47—4.7 muF
C48—0.01 muF
C49—470 pF
C50—0.1 F
C51—1 muF
C52—0.0047 muF
C53—0.1 muF
C54—0.1 muF
C55—10 muF
C56—0.01 muF
C57—0.05 muF Resistors:
R1—20 K ohm
R2—20 K ohm
R3—1K ohm
R4—50 K ohm
R5—20 K ohm
R6—1 K ohm
R7—50 K ohm
R8—28 K ohm
R9—1 K ohm
R10—93.1 K ohm
R11—93.1 K ohm
R12—191 K ohm
R13—191 K ohm
R14—34 K ohm
R15—34 K ohm
R16—10 K ohm (adj.)
R17—10 K ohm (adj.)
R18—10 K ohm (adj.)
R55—1 K ohm
R56—5.1 K ohm
R62—1 K ohm
R63—10 K ohm (adj.)
R64—10 K ohm (adj.)
R72—50 K ohm
R73—2 meg ohm
R74—10 K ohm
R75—5 K ohm (adj.)
R76—10 K ohm
R77—10 K ohm
R78—100 K ohm
R79—100 K ohm
R80—100 K ohm
R81—100 K ohm (adj.)
R82—20 K ohm
R83—470 K ohm
R84—1 K ohm
R85—100 K ohm
R8—66.8 K ohm
R87—10 K ohm
R88—50 K ohm
R89—10 K ohm
R90—10 K ohm (adj.)
R91—10 K ohm
R92—1 K ohm
R93—10 K ohm (adj.)
R94—1 K ohm
R95—1 K ohm (adj.)
R96—10 K ohm
R97—5 K ohm (adj.)
R105—1 K ohm
R106—20 K ohm (adj.)

Chips and Operational Application:

U1—UAF42
U2—UAF42
U3—UAF42
U12—LF442CN
U13—LM380
U20—LF442CN
U21—LM311
U22—2n7000
U23—4024
U24—LM555
U25—4060
U26—LM331
U27—OP290
U28—OP290

Switches:

SW3

Figure 6:
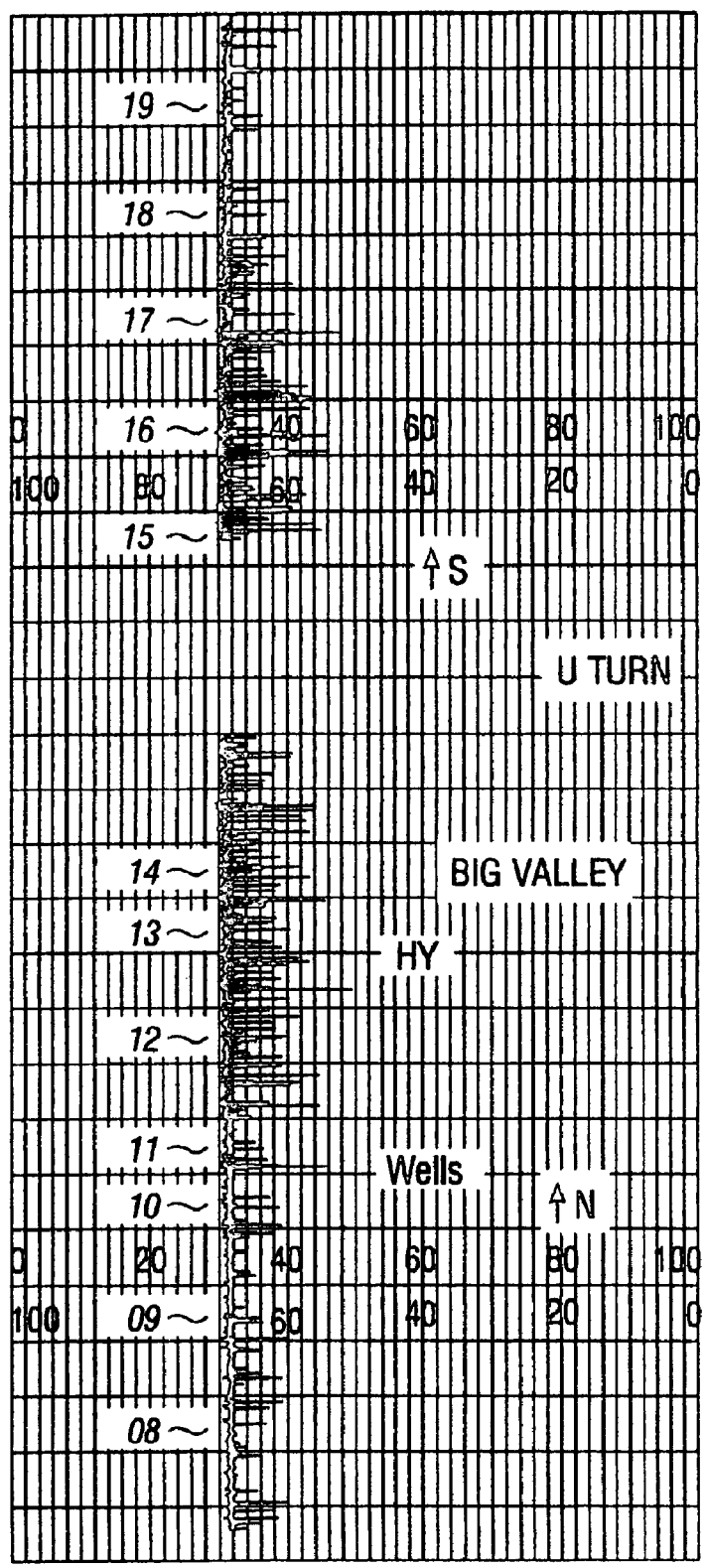
FIG. 6 shows another log obtained using an electromagnetic impulse apparatus according to the present invention.

Referring now to FIG. 6, there is shown a log obtained by using the device of FIGS. 5A & 5B using a chart recorder. The device was carried on a small plane with the antenna trailing below and behind the airplane. The plane flew at a speed of 120 mph at an altitude of 300 feet. This airborne run was performed by flying from South to North (S to N) for about 6 miles and then making a u-turn flying North to South (N to SO for about 6 miles retracing the initial S to N flying route over the Big Finn Valley Reef Oil Field in Alberta, Canada (Big Valley notation on the log).

The S to N mile markers 07 through 14 and N to S mile markers 15 through 20 are shown on FIG. 6. GPS waypoints were saved at each mile mark to correlate the signal strength (counts) with the GPS positions. The notations "wells" and "Hy" (for highway) were made on the log for additional reference points. Increased pulse or count density (signal strength) was encountered between markers 11–14 and on the return trip at 15–18, with the wells notation at mark 11.

Though not shown, a map of the area can be scanned into GPS mapping software on a computer, for example, Des Newman's OziExplorer Version 3.84.2, which works with Magellan, Garmin, Lowarance, Eagle and MLR GPS receivers. Then, the stored waypoint data in the GPS receiver can be downloaded into this software to indicate the positions where the airborne survey was conducted.

In this case, a Garmin receiver was used. The waypoints for the route flown at the markers identified on the log were downloaded into the software program. The count or signal strength were noted on the map to identify areas of greatest interest.

The map can be an underground topographical map from 3-D seismic showing the strata formations which are conducive to the accumulation hydrocarbons. The count data can be positioned on the map to identify areas of greatest interest for additional airborne surveys. Further, the survey can be performed where the fly routes are a series of parallel routes at predetermined spaced distances or a grid pattern and the data placed on the map by relative strength indications using different colors on the map, thereby corresponding the data to the geology of the area to identify areas of greatest interest for additional airborne surveys to fine tune the map and/or pinpoint potential drilling sites.

Rather than or in addition to the chart recording, the data can be captured on a computer and displayed on the computer screen along with the GPS location (that is also downloaded to the computer) in real-time.

Figure 7:
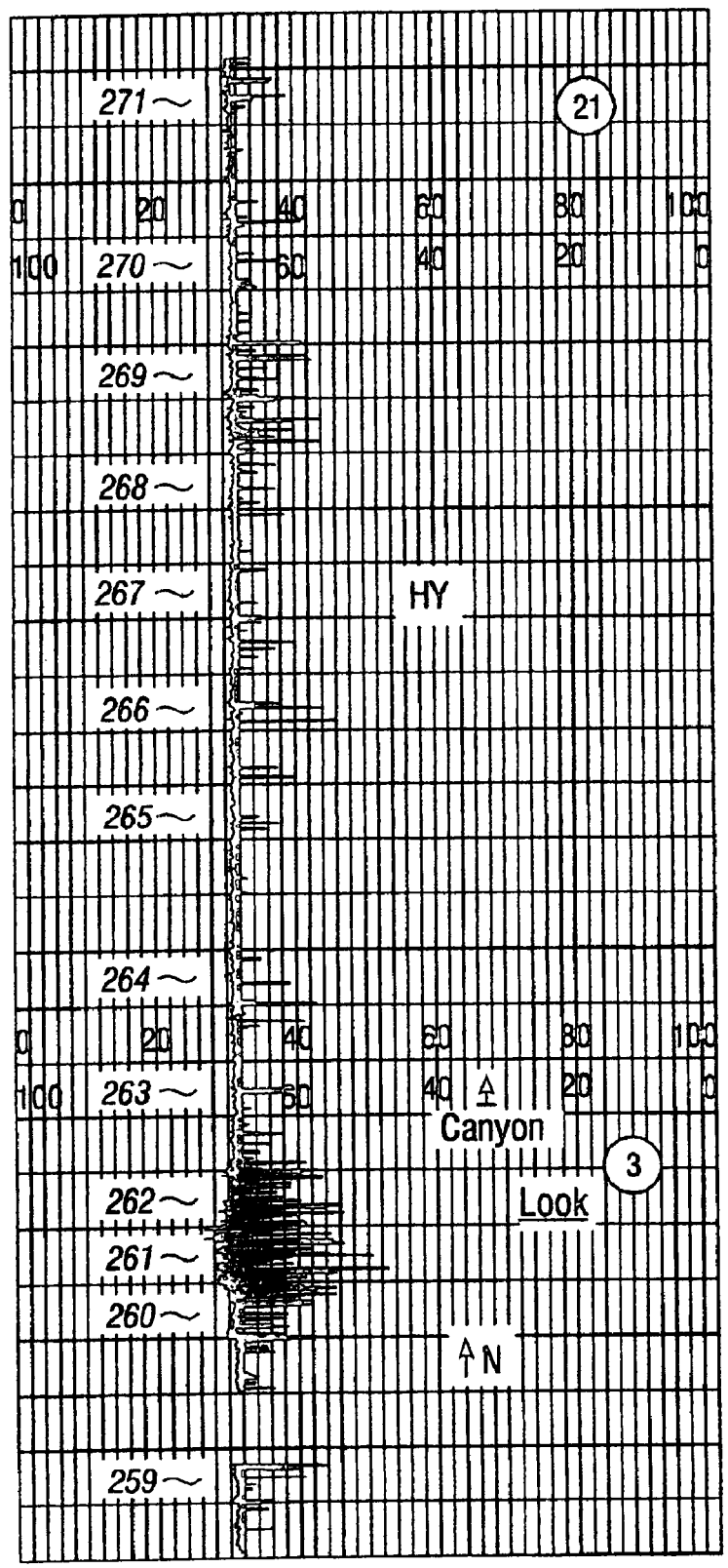
FIG. 7 shows another log obtained using an electromagnetic impulse apparatus according to the present invention.

Referring now to FIG. 7, there is shown another chart recorded log of an airborne survey using the device of FIGS. 5A & 5B performed over another portion of the Big Finn area. At about the same altitude and speed, the airborne survey was conducted over a pinnacle Devonian reef over a 10 to 12 mile line. Between markers 260 to 262, here is shown a significant increase in count activity corresponding to the Devonian LeDuc Reef. Such reefs are difficult to locate using conventional seismic techniques since they are so small, relatively speaking to the types of formations typically detected by seismic.

To this point, out of 14 airborne surveys used to locate potential drilling sites in wildcat territory in South Texas, all 14 have resulted in wells capable of producing in commercial quantities of hydrocarbons, that is, gas and/or oil.

Many methods can be employed to indicate count rates exceeding that of the base count. In a preferred embodiment, an alarm similar to a radiation detector triggers a response once the base count has been exceeded.

What is claimed is:

1. A passive geophysical prospecting method, the method consisting essentially of:

traversing above the surface of the Earth with an antenna;

detecting electromagnetic radiation naturally emanating from the Earth's surface with the antenna;

generating an electrical signal from the detected electromagnetic radiation while performing the traversing step;

filtering from the electrical signal frequencies below 65 Hz and above 12,000 Hz to generate a filtered signal;

converting the filtered signal to a prospecting voltage signal; and comparing the prospecting voltage signal to a set voltage and generate an output signal which provides information regarding the presence or absence of the deposit of interest.

2. The method of claim 1, wherein the electrical signal is amplified prior to the filtering step.

3. The method of claim 1, wherein the output signal is in the form of counts per second.

4. The method of claim 1, further comprising recording location information corresponding to the output signal.

5. The method of claim 4, wherein the location information is generated using a GPS device.

6. The method of claim 3, wherein the counts per second are digitized and stored in a computer.

7. The method of claim 6, further comprising recording location information generated by a GPS device and storing the location information with corresponding counts per second.

8. The method of claim 7, further comprising mapping on a map the output signal using the stored location information to identify areas containing hydrocarbons.

9. The method of claim 1, wherein the output signal is a voltage signal.

10. The method of claim 1, further comprising:

establishing a base output signal corresponding to the output signal of an area devoid of the deposit of interest; and analyzing the difference between these output signals to determine the absence or presence of the deposit of interest.

11. A passive geophysical, prospecting apparatus, the apparatus consisting essentially of:

an antenna for detecting electromagnetic radiation naturally emanating from the Earth's surface and generating an electrical signal from the detected electromagnetic radiation while traversing above the Earth's surface;

a filter for filtering from the electrical signal frequencies below 65 Hz and above 12,000 Hz to generate a filtered signal;

a converter for converting the filtered signal to a prospecting voltage signal;

a level detector for comparing the prospecting voltage signal and a set voltage and generating a difference signal; and means for recording the difference signal.

12. The apparatus according to claim 11, wherein the difference signal is in counts per second.

13. The apparatus according to claim 11, further comprising means for analyzing the difference signals to determine the absence or presence of the deposit of interest.

14. The apparatus of claim 11, wherein the base voltage is set to a base voltage signal corresponding to a filtered signal of an area devoid of the deposit of interest.

* * * * *